United States Patent Office 3,709,799
Patented Jan. 9, 1973

3,709,799
BRIGHT TIN ELECTRODEPOSITING
Marcis M. Kampe, Brookline, Mass., assignor to Enthone, Incorporated, New Haven, Conn.
No Drawing. Filed July 30, 1970, Ser. No. 59,730
Int. Cl. C23b 5/14
U.S. Cl. 204—54 R    24 Claims

ABSTRACT OF THE DISCLOSURE

Acid tin baths for electrodepositing bright tin comprising tin ions, free acid, a non-ionic surface active agent and as a brightening agent a Schiff base-terminated, substantially linear, low molecular weight, soluble polymeric crotonaldehyde. The polymeric crotonaldehyde is a Schiff base-terminated homopolymer or copolymer. The mole ratio of the primary amine precursor of the Schiff base terminal group or groups to $\alpha$-, $\beta$-ethylenically unsaturated aldehyde, which is crotonaldehyde in the case of the homopolymers and the total of crotonaldehyde plus a different $\alpha$-, $\beta$-ethylenically unsaturated aldehyde copolymerizable compound when such a compound is a copolymerizable reactant, provided in the polymerization reaction mixture in the preparation of the polymer is in the molar ratio range of about 1:2.5 to about 1:7.5 respectively. Additive compositions for said tin electrodepositing baths are also provided by this invention.

BACKGROUND OF THE INVENTION

(1) Field of the invention

This invention relates to tin electrodepositing and more especially to bright acid tin electrodepositing baths and to additive compositions for use in electrodepositing bright tin from acid tin electrodepositing baths.

(2) Description of the prior art

Acid tin electroplating baths for producing bright tin deposits are disclosed in the prior art as containing sulfonate or fluoborate ions, a reducing agent such as Formalin, a non-ionic surfactant, and as brightening agent an aromatic or heterocyclic ring-containing aldehyde wherein the carbonyl group is directly attached to the aromatic or heterocyclic ring or an $\alpha$-, $\beta$-olefinically unsaturated carbonyl compound such as $\Delta^{1,3}$-dihydro-o-tolylaldehyde, $\Delta^{1,3}$-dihydrobenzaldehyde, cinnamaldehyde, $\alpha$-ethyl cinnamic acid aldehyde, 2,4-hexadienal, 3-formyl, 5,6-dihydro-2,6-dimethylpyrane, benzalacetone, benzalacetophenone, 2-benzalcyclohexanone, vinyl-phenylketone, p-chlorobenzalacetone, 2 - cinnamylthiophenene, 2-($\omega$-acetyl)-vinylfurane, 2-($\omega$-benzoyl)-vinylfurane, p-Cl-phenylstyrylketone, isobutyl-styrylketone, $\omega$-acetyl cinnamic acid ethyl ester and p-tolylstyrylketone. The addition to acid tin electroplating baths of crotonaldehyde per se in solution in isopropanol also containing o-toluidine dissolved therein did not result in bright tin electrodeposits. The addition of crotonaldehyde per se separately to the tin electrodepositing bath resulted in some brightening of the tin electrodeposit. No brightness was imparted to the tin electrodeposits produced from acid tin electroplating baths when acrolein per se was the additive to the bath. Moreover the strong lachrymatory and irritating properties of acrolein as well as the toxic nature of this compound makes it difficult to work with.

Acid tin electroplating baths producing bright tin deposits are also disclosed in the prior art as containing sulfate, sulfonate or fluoborate ions, a non-ionic surface active agent, as primary brightener an olefinically unsaturated organic carbonyl compound selected from those disclosed supra, and a polymerizable organic compound caapble of reducing the overvoltage for the evolution of hydrogen at a tin cathode such as acrylic acid, methacrylic acid, acrylicamide, methacrylicamide, glycidylacrylate, propylene glycolacrylate, dimethyl-aminoethylmethacrylate, glyoxal, glutaric dialdehyde, $\alpha$-hydroxyadipicaldehyde, N-vinylpyrolidone, p-diethylaminobenzaldehyde, N-vinylcarbazole, 2-vinylpyridine, tetrahydrofuran, vinyl acetate, and alkylglycidyl ether.

Acid bright tin electroplating baths are also known in the prior art which contain a primary brightener of the formula X—CH=CH—Y wherein X is phenyl, furfuryl or pyridyl and Y is hydrogen, formyl, carboxyl, alkyl, hydroxyalkyl, formylalkyl or the acyl radical of a carboxylic acid. Formaldehyde and certain imidazoline derivatives serve as secondary brighteners in such baths, especially when employed with non-ionic wetting agents.

BRIEF SUMMARY OF THE INVENTION

Bright tin electrodeposits are obtained in accordance with the present invention by utilizing as a brightening agent in otherwise conventional aqueous acid tin electrodepositing baths a Schiff base-terminated, substantially linear, low molecular weight, soluble polymer of crotonaldehyde. The polymeric crotonaldehyde is a Schiff base-terminated homopolymer or copolymer. The polymeric crotonaldehyde is that which has been prepared by a polymerization process hereinafter disclosed wherein the ratio of the primary amine precursor of the Schiff base terminal group or groups to the $\alpha$-, $\beta$-ethylenically unsaturated aldehyde polymerizable reactant in the polymerization reaction mixture is in the molar ratio range of about 1:2.5 to about 1:7.5 respectively. Such ethylenically unsaturated carbonyl group-containing compound polymerizable reactant is crotonaldehyde in the case of the homopolymers, and the total of crotonaldehyde plus the different $\alpha$-, $\beta$-ethylenically unsaturated aldehyde copolymerizable reactant, for instance acrolein or methacrolein, in the case of the copolymers. In the case of copolymers where the different copolymerizable reactant other than the crotonaldehyde utilized in the copolymer preparation is not an $\alpha$-, $\beta$-ethylenically unsaturated aldehyde, such mole ratio in the molar ratio range of about 1:2.5 to about 1:7.5 is of the primary amine to only crotonaldehyde respectively. The tin electrodepositing bath also comprises tin ions, free acid, e.g. fluoboric acid, and a non-ionic surface active agent.

The primary amine should be present in the polymerization reaction mixture in the preparation of the polymer in amount to provide a mole ratio of the primary amine to the $\alpha$-, $\beta$-ethylenically unsaturated aldehyde therein within the molar ratio range of about 1:2.5 to above 1:7.5 respectively from the reasons that addition of the primary amine in an amount appreciably greater than a mole ratio of 1:2.5 of such amine to the $\alpha$-, $\beta$-ethylenically unsaturated aldehyde resulted in no tin plating in the low current density areas and undesirable streaking in the tin electrodeposit in the high current density areas. Addition of the primary amine to the polymerization reaction mixture in an amount substantially less than a mole ratio of 1:7.5 of such amine to the $\alpha$-, $\beta$-ethylenically unsaturated aldehyde tends to result in cross-linking of the polymer to form an insoluble, three-dimensional resin which is unsatisfactory for use in the plating bath, and may also result in degradation and decomposition of the polymer.

The Schiff base terminal groups of the polymeric crotonaldehydes herein have the formula

wherein R is the remainder of the residue of a primary amine as is hereinafter defined and can be, for example, an aryl, heterocyclic or aralkyl radical.

The Schiff base terminal group or groups of the polymers of this invention, obtained as disclosed supra, prevent crosslinking of the polymer to form the insoluble, three-dimensional resin which is unsatisfactory for use in the tin electrodepositing bath, and also stabilize the polymers to prevent degradation and decomposition of the polymer. Additionally the Schiff base terminal group or groups of the polymers of this invention appear to have another function in the tin electrodepositing baths besides their polymer stabilization function, and that is to impart brightness to the tin electrodeposit.

The homo- and copolymers of crotonaldehyde of this invention are usually of molecular weight in the range of about 300–900. The exact structure of the polymers herein is not known. In theory, the homopolymers contain recurring Schiff base group-containing units of the formula

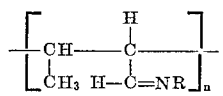

wherein $n$ is the number of recurring units and R is the remainder of the residue of a primary amine, for example an aryl, aralkyl or heterocyclic radical, when polymerization is through the C=C double bond; and the homopolymers have the following formula

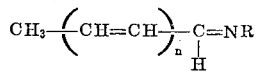

wherein $n$ is a positive integer and R has the meaning disclosed immediately supra when the polymerization is by a polyaldol condensation. It is believed both the vinyl type polymerization, i.e. through the C=C double bond, and the polyaldol condensation occur in preparing the polymeric crotonaldehydes herein, with the vinyl type polymerization believed to predominate. It also is believed that some of the aldehyde groups of the polymers herein are converted to ether or hydroxyl or ester linkages and hence are unavailable for reaction with the primary amine to form Schiff base terminal groups. When R of the above Schiff base terminal group and polymer formulae is aryl, exemplary of such aryl radical is phenyl, tolyl, xylyl and naphthyl; when R is a heterocyclic radical exemplary of the heterocyclic radical is a nitrogen heterocyclic radical such as pyridyl, and when R is an aralkyl radical, i.e. an aromatic alkyl radical, exemplary of the aralkyl radical is benzyl amine.

The polymers of this invention are obtained by polymerizing the crotonaldehyde monomer in the case of the homopolymers, or the crotonaldehyde and the different copolymerizable reactant or comonomer or comonomers in the case of the copolymers at a polymerization temperature in an aqueus alkaline liquid medium, preferably a dilute aqueous solution of a weak base, for example, an alkali metal carbonate, e.g. sodium carbonate, potassium carbonate, or sodium bicarbonate, also containing a primary amine as Schiff base terminal group precursor. Dilute aqueous solutions of other alkaline materials such as, for example, sodium hydroxide, or potassium hydroxide or triethylamine can also be utilized although strong bases such as sodium hydroxide or potassium hydroxide are not preferred. The polymerization is commenced at normal or room temperature or a temperature slightly above room temperature and, if necessary, cooling of the reaction mixture is effected during the polymerization. The preparation of polycrotonaldehyde of a low molecular weight of about 350 by aldol condensation in the presence of triethylamine as a catalyst is disclosed in Journal of Polymer Science, vol. VII, No. 6, pages 653–655, 1951. A Schiff base-terminated, stabilized, substantially linear, soluble, low polymer is obtained which theoretically, in the case of crotonaldehyde homopolymers, has the formula

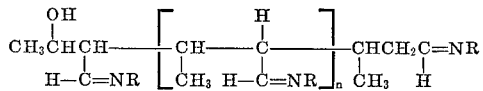

wherein $n$ is the number of recurring units and R is the remainder of the residue of the primary amine, e.g. aryl, heterocyclic, for instance pyridyl, or aralkyl, when the polymerization is through the C=C double bond; and theoretically the following formula when the polymerization is by a polyaldol condensation:

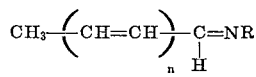

wherein $n$ is a positive integer and R has the meaning disclosed immediately above. In the first-mentioned formula set forth immediately supra for the theoretical homopolymers, all of the aldehyde groups have been reacted with the primary amine to form Schiff base terminal groups. This may or may not be the actual situation in the polymeric crotonaldehydes herein including the homo- and copolymers of thic compound when polymerization is through the C=C double bond, and it is not necessary for satisfactory results in this invention that all of the aldehyde carbonyl groups be condensed with the primary amine to form the Schiff base terminal group in this vinyl type polymer, which can also be designated an "ionic type" polymer. In case of polyaldol condensation polymers of this invention however, it is important that the single aldehyde group be reacted with the primary amine to form the Schiff base terminal group.

The term "remainder of the residue of a primary amine" used herein means the remaining portion of the primary amine exclusive of the nitrogen atom and amino group hydrogens after the amino group hydrogens have reacted with the carbonyl group oxygen of the polymeric crotonaldehyde by a condensation reaction to form the Schiff base terminal group or groups thereof. Such remaining portion of the primary amine is, for example an aryl group, heterocyclic or aralkyl group as is previously disclosed herein.

The polymeric Schiff base-terminated crotonaldehydes herein are soluble in common organic solvents, for example 1–3C alkyl alcohols, methyl ethyl ketone, acetone and dimethyl formamide.

Any suitable primary amine is utilizable herein as reactant for forming the Schiff base terminal group or groups. Examplary of the primary amines are the mono- and bicyclic aryl primary amines, e.g. o-, m- and p-toluidines, aniline, xylidines, e.g. 2,3-dimethylaniline, 2,4-dimethylaniline, 2,5-dimethylaniline, 3,4-dimethylaniline and 3,5-dimethylaniline, α-naphthyl amine and p-phenylenediamine; heterocyclic amines, e.g. aminopyridines, e.g. 2-aminopyridine and 3-aminopyridine; and aralkyl amines, e.g. benzylamine. The primary amine utilized should of course be one that is capable of stabilizing the polymer or copolymer by the Schiff base terminal group or groups formation to prevent crosslinking and decomposition, which all of the above-disclosed primary amines are capable of doing.

More specifically in the preparation of the Schiff base-terminated polycrotonaldehyde herein, the alkaline material, for instance the weak base, e.g. sodium carbonate or potassium carbonate, is dissolved in water, the primary amine is added to the solution as Schiff base terminal group precursor, and the crotonaldehyde monomer in the case of the homopolymer, and such monomer and the different copolymerizable reactant or reactants or comonomer or comonomers in the case of the copolymer, are added to the aqueous liquid. The polymerization commences at normal or room temperature and if required, cooling of the reaction mixture is effected during the polymerization. The polymerization reaction is effected for a period sufficient to produce the desired Schiff base-terminated homo- or copolymer as the case may be. The thus-formed polymer or copolymer is then separated from the aqueous liquid, for example by decanting, washed with water, and usually dissolved in a suitable organic liquid solvent, e.g. isopropanol.

The non-ionic surface active agent herein also imparts brightening to the tin electrodeposit as well as functioning as a wetting agent in the bath. By reason of imparting brightening to the electrodeposit, the non-ionic surface active agent may be considered a secondary brightener in this invention. If the non-ionic surface active agent is considered a secondary brightener, then the polymeric crotonaldehyde is considered to be and designated a primary brightener herein. However if the non-ionic surfactant is not considered a secondary brightener herein, then the polymeric crotonaldehyde is designated herein simply as a brightening agent.

Additional additives can be added to the tin electrodepositing baths of this invention such as polyvinylpyrrolidone as a molecular complexer, additional isopropanol to aid in solubilizing the terminated polymeric crotonaldehyde, and additional aromatic primary amine, e.g. o-, m- or p-toluidine or aniline. The separate addition of such additional aromatic primary amine to the tin electrodepositing bath containing the Schiff base-terminated homopolymer or copolymer of this invention and the non-ionic surface active agent resulted in an appreciably brighter tin electrodeposit over that obtained by the combination of the Schiff base-terminated homopolymer or copolymer and the non-ionic surface active agent.

The amounts of the Schiff base-terminated polymeric crotonaldehyde and of the non-ionic surface active agent added to the tin electrodepositing bath is an amount of each which is sufficient to provide a bright tin electrodeposit. The terminated polymeric crotonaldehyde and non-ionic surfactant are utilizable in the baths in amounts that can be varied over a fairly broad range. Actually only small or minor amounts of each will suffice in the electrodepositing bath, with typically about 5%-10% by weight of the Schiff base-terminated polymeric crotonaldehyde and typically about 2-20 ml. of the non-ionic surfactant per liter of the bath solution giving satisfactory results. Greater amounts of the terminated polymeric crotonaldehyde can be added to the bath with the upper limit being determined by factors of economy and solubility of the particular terminated homo- or copolymer of crotonaldehyde and somewhat smaller amounts of the polymer can be added to the bath. Greater amounts of the non-ionic surfactant can also be utilized in the bath and somewhat smaller amounts of the surfactant can also be utilized herein.

The temperature of the tin electrodepositing baths herein during the electroplating is usually in the range of 65°-85° F.

The electrodepositing baths of this invention provide bright smooth tin deposits over a wide range of current densities, which may range from low through high current densities, inclusive.

In carrying out the tin electrodeposition, the article or articles on which the tin is to be deposited is made the cathode in the electrodepositing bath of this invention and a direct electrical current passed from the anode or anodes through the bath to the cathode.

Any suitable non-ionic surface active agent or surfactant is utilizable herein. The non-ionic surface active agent is exemplified by Triton N-101, a nonyl phenol polyether alcohol; Triton X-100, an actyl phenol polyether alcohol and other alkyl aryl polyether alcohols disclosed in the publication "Rohm & Haas Surfactants, Handbook of Physical Properties," published by Rohm & Haas Co., Independence Mall West, Philadelphia, Pa. 19105. Additional examples of non-ionic surface active agents utilizable herein are Igepal CO-710, Igepal CO-730, Igepal CO-630 and Igepal CO-430, obtainable from the Antara Chemical Company.

The brightener additive of this invention comprises a mixture of the Schiff base-terminated, substantially linear, low molecular weight, soluble polymeric crotonaldehyde and a water-miscible diluent or carrier therefor. The diluent or carrier is usually a water-miscible organic liquid solvent such as for example a 1–3 C. alkyl alcohol, methyl ethyl ketone, acetone, ethylene glycol and glycerine, with the polymeric crotonaldehyde dissolved in the solvent whereby the additive composition is a solution. Dimethyl formamide is also utilizable herein as such solvent. The polymeric crotonaldehyde can be a homopolymer or copolymer as is previously disclosed herein.

The amount of polymeric crotonaldehyde in the brightener additives herein can be varied over a broad range. Thus the polymeric crotonaldehyde (homopolymer or copolymer) can be present in the brightener additive in an amount in the range of about 5%-95% by weight based on total additive composition. The non-ionic surface active agent may also be a constituent of the brightener additive of the invention and, when utilized therein, will usually be present in amount within the range of about 1-30% by weight based on total additive composition.

Alternatively the Schiff base-terminated polymeric crotonaldehyde can be added as such to the acid tin electro-depositing bath but this is not preferred.

The polymeric crotonaldehydes of this invention are of low or limited solubility in the tin electroplating baths herein but are sufficiently soluble in the baths to be effective therein as brighteners.

Copolymers of crotonaldehyde and a different copolymerizable compound utilizable as brightening agent in the tin plating baths herein are, for example, copolymers of crotonaldehyde and acrolein, copolymers of crotonaldehyde and methacrolein, copolymers of crotonaldehyde and formaldehyde, copolymers of crotonaldehyde and acrylamide and copolymers of crotonaldehyde and vinyl acetate. The copolymers are preparable by the same polymerization process utilized to prepare the homopolymers herein and previously disclosed herein, and involving copolymerizing the comonomers or copolymerizable materials in an aqueous alkaline liquid medium as exemplified by a dilute aqueous solution of a weak base, e.g. potassium carbonate, sodium carbonate or sodium bicarbonate also containing the primary amine as Schiff base terminal group precursor. The crotonaldehyde-acrolein copolymers are prepared by copolymerizing the crotonaldehyde and acrolein usually in a mole ratio in the molar ratio range of 1–4:1 respectively; the crotonaldehyde-methacrolein copolymers are prepared by copolymerizing the crotonaldehyde and methacrolein usually in a mole ratio in the molar ratio range of 4:1 respectively; the crotonaldehyde-formaldehyde copolymers by copolymerizing the crotonaldehyde and formaldehyde usually in a mole ratio in the molar ratio range of about 4:1 to about 3:2 respectively; the crotonaldehyde-acrylamide copolymers by copolymerizing the crotonaldehyde and acrylamide usually in a mole ratio in the molar ratio range of about 4.9:0.1 to about 4:1 respectively; and the crotonaldehyde-vinyl acetate copolymer by copolymerizing the crotonaldehyde and vinyl acetate usually in a mole ratio in the molar ratio range of about 4.9:0.1 to about 4:1 respectively. The exact structure of the copolymers herein is not known with certainty as it is believed that some of the aldehyde groups are converted to ether, hydroxy or ester linkages. Further a polyaldol condensation may occur of a portion of the crotonaldehyde. The copolymers as well as the homopolymers are Schiff base-terminated and stabilized as is hereinafter disclosed to prevent cross-linking and degradation and decomposition of the copolymer.

The tin ions are usually supplied in the electrodepositing baths herein as a water-soluble stannous salt, for example stannous fluoborate or stannous sulfate. The free acid of the baths are exemplified by fluoboric, sulfuric or aromatic sulfonic acids. e.g. benzene sulfonic acid. The tin and free acid concentrations of the baths can be varied over fairly broad limits as is well known in the art, with a tin content of 15–100 grams per liter (calculated as Sn) and a free acid concentration of 35–200 grams per liter being typical of the sulfate, fluorborate and aromatic sulfonate baths.

DESCRIPTION OF THE PREFERRED EMBODIMENTS

The primary amine utilized to terminate and stabilize the polymeric crotonaldehydes herein by the condensation reaction with the aldehyde group or groups to form Schiff base terminal groups is preferably an aromatic primary amine, more preferably o-, m- or p-toluidine or aniline. The Schiff base terminal group or groups have the following formula when the o-, m- or p-toluidine or aniline is employed as Schiff base precursor:

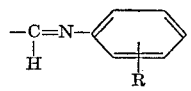

wherein R is —CH$_3$ or —H. Among the toluidines, o-toluidine is preferred.

The tin plating baths are preferably fluoborate baths wherein the free acid is fluoboric acid and the tin or stannous ions supplied as stannous fluoborate.

The alkaline material of the aqueous alkaline liquid medium or solution wherein the polymerization or copolymerization herein is effected is preferably a weak base such as, e.g., an alkali metal carbonate, for example sodium carbonate or potassium carbonate. Such aqueous alkaline solution is preferably a dilute solution of the alkaline material, typically of a concentration of about 3–10 weight percent of the alkaline material.

The Schiff base-terminated polymeric crotonaldehyde, whether it is the homopolymer or copolymer, is preferably added to the acid tin electrodepositing bath as a constituent of the additive composition hereinbefore disclosed which also contains water-miscible organic liquid solvent therefor as diluent or carrier.

The temperature of the tin plating baths is preferably in the range of about 65° to 85° F. during the plating.

The following tests were carried out to evaluate homo- and copolymers of this invention as brightener additives in acid tin electroplating:

TEST RUN NO. 1

Part A

To 104 ml. of water at room temperature in a reaction vessel was added 94 grams of crotonaldehyde (90%) (1.02 mole) with vigorous stirring of the water and resulting aqueous mixture during the addition. 8 grams of sodium carbonate and 24 grams of aniline (0.26 mole) as precursor for Schiff base termination of the ultimate polymeric crotonaldehyde were then added to the resulting mixture. The molar ratio of the aniline to crotonaldehyde was about 1:4 respectively. After 48 hours of stirring, a Schiff base-terminated, substantially linear, low homopolymer of crotonaldehyde precipitated from the liquid as a dark amber resinous material which was separated by decanting, and dissolved in 400 ml. of isopropanol.

Part B 2 ml. of this isopropanol solution of the Schiff base-terminated homopolymer of crotonaldehyde was added to an aqueous fluoborate acid tin electroplating bath of the following composition:

Stannous fluoborate _____g./l__ 50
Fluoboric acid (48%) _____g./l__ 100
Formaldehyde aqueous solution (37%) ____ml./l__ 10

0.5 ml. of an ethoxylated nonyl phenol surfactant was also added to the acid fluoborate tin electroplating bath. Tin plating was carried out in such electroplating bath in a Hull test cell under the following conditions: operating current of 1 and 3 amps; room temperature of the bath; plating time of 5 minutes. The tin electrodeposit on the Hull test panel showed good brightness over a current density range of 10–80 a.s.f.

TEST RUN NO. 2

Part A

A Schiff base-terminated, substantially linear, low homopolymer of crotonaldehyde was prepared by a substantially identical procedure and utilizing substantially identical reaction conditions and substantially identical amounts of materials as utilized in Test Run No. 1, Part A herein, except that 27.4 grams of o-toluidine (0.25 mole) was utilized in this Test Run as Schiff base precursor for terminating the ultimate homopolymer of crontonaldehyde instead of the aniline. The molar ratio of the o-toluidine to crotonaldehyde was about 1:4 respectively. The Schiff base-terminated homopolymer of crontonaldehyde was separated from the liquid by decanting and dissolved in 400 ml. of isopropanol.

Part B 3 ml. of this isopropanol solution of the Schiff base-terminated homopolymer of crontonaldehyde was added to a stannous fluoborate-containing acid tin electroplating bath of substantially identical composition as that set forth in Test Run 1, Path B herein.

3 ml. of an ethoxylated nonyl phenol surfactant was also added to such tin electroplating bath. Tin plating was carried out in such electroplating bath in a Hull test cell under operating conditions of current amperage, bath temperature and plating time substantially identical to those set forth in Test Run 1, Part B herein. The tin electrodeposit on the Hull test panel was of good brightness over a current density range of 10–80 a.s.f.

TEST RUN NO. 3

Part A

To 100 ml. of water at room temperature in a reaction vessel was dispersed 94 grams of crontonaldehyde (90%) (1.02 mole). While vigorously agitating the resulting mixture, 10 grams of sodium hydroxide and 49 grams of aniline (0.52 mole) as precursor for Schiff base-termination of the ultimate homopolymer of crontonaldehyde were added thereto. The molar ratio of the aniline to crotonaldehyde was 1:2 respectively. The exothermic reaction occurring produced a Schiff base-terminated, substantially linear, low homopolymer of crotonaldehyde, which was a red resinous material and which was separated from the liquid by decanting, washed with water, and dissolved in 300 ml. of isopropanol.

Part B 3 ml. of the isopropanol solution of such Schiff base-terminated homopolymer of crontonaldehyde was added to a stannous fluoborate-containing acid tin electroplating bath of substantially identical composition as that set forth in Test Run 1, Part B herein.

3 ml. of an ethoxylated nonyl phenol surfactant was also added to such tin electroplating bath. Tin plating was carried out in such electroplating bath in a Hull test cell under operating conditions of current amperage, bath temperature and plating time substantially identical to those set forth in Test Run 1, Part B herein.

The tin electrodeposit on the Hull test panel was of good brightness over a current density range of 10–70 a.s.f.

TEST RUN NO. 4

Part A

To 100 ml. of water at room temperature in a reaction vessel was added 37.5 grams of crotonaldehyde (90%) (0.48 mole) and 10 grams of aqueous formaldehyde (37%) (0.17 mole). While vigorously stirring the resulting liquid mixture, 4 grams of sodium carbonate and 7 grams of o-toluidine (0.07 mole) as precursor for the Schiff base-termination of the ultimate crotonaldehyde-formaldehyde copolymer were added thereto. The molar ratio of the o-toluidine to crotonaldehyde was about 1:7 respectively. After 16 hours of agitation, a Schiff base-terminated, substantially linear, low copolymer of crotonaldehyde and formaldehyde, which was a reddish brown resinous solid, was formed and was separated from the liquid by decanting, washed with water, and dissolved in 200 ml. of isopropanol.

Part B 2 ml. of this isopropanol solution of the Schiff base-terminated coppolymer of crotonaldehyde and formaldehyde was added to a stannous fluoborate-containing acid tin electroplating bath of substantially identical composition as that set forth in Test Run No. 1, Part B herein. 0.5 ml. of an ethoxylated nonyl phenol surfactant was also added to such tin electroplating bath. Tin plating was carried out in such electroplating bath in a Hull test cell under operating conditions of current amperage, bath temperature and plating time substantially identical to those set forth in Test Run 1, Part B herein.

The tin electrodeposit on the Hull test panel was of good brightness over a current density range of 10–50 a.s.f.

TEST RUN NO. 5

Part A

Ninety-four (94) grams of crotonaldehyde (90%) (1.02 mole), 20 grams of aniline (0.22 mole) and 4 grams of p-phenylene-diamine (0.04 mole) were admixed with 100 ml. of water at room temperature in a reaction vessel. The aniline and p-phenylene-diamine were precursors for the Schiff base-termination of the ultimate homopolymer of crotonaldehyde. The molar ratio of the total aniline plus p-phenylene-diamine to crotonaldehyde was about 1:4 respectively. While vigorously agitating the resulting liquid mixture, 4 grams of sodium carbonate and 2 grams of sodium hydroxide were added thereto. After 24 hours a Schiff base-terminated, substantially linear, low homopolymer of crotonaldehyde was formed, which was a red resinous material and separated from the liquid by decanting, washed with water, and dissolved in 500 ml. of isopropanol.

Part B 3 ml. of this isopropanol solution of the Schiff base-terminated homopolymer of crotonaldehyde was added to a stannous fluorborate-containing acid tin electroplating bath of substantially identical composition as that set forth in Test Run 1, Part B herein. 0.5 ml. of an ethoxylated nonyl phenol surfactant was also added to such tin electroplating bath. Tin plating was effected in such electroplating bath in a Hull test cell under operating conditions of current amperage, bath temperature and plating time substantially identical to those set forth in Test Run 1, Part B herein. The tin electrodeposit on the Hull test panel was of good brightness over a current density range of 10–60 a.s.f.

TEST RUN NO. 6

Part A

Three (3) grams of sodium hydroxide, 47 grams of crotonaldehyde (90%) (0.60 mole) and 13.8 grams of o-toluidine (0.13 mole) were dissolved in 50 ml. of water at room temperature in a reaction vessel while vigorously agitating the water and resulting aqueous solution. The o-toluidine was a precursor for the Schiff base-termination of the ultimate homopolymer of crotonaldehyde. The molar ratio of the o-toluidine to crotonaldehyde was about 1:5 respectively. After 2 hours a Schiff base-terminated, substantially linear, low homopolymer of crotonaldehyde, which was a pale yellow oily semi-solid, precipitated from the liquid, was separated by decanting, washed with water, and dissolved in 200 ml. of disopropanol.

Part B 3 ml. of the isopropanol solution of such Schiff base-terminated homopolymer of crotonaldehyde was added to a stannous fluoborate-containing acid tin electroplating bath of substantially identical composition as that set forth in Test Run 1, Part B herein. 1 ml. of an ethoxylated nonyl phenol surfactant was also added to such tin electroplating bath. Tin plating was carried out in such electroplating bath in a Hull test cell under operating conditions of current amperage, bath temperature and plating time substantially identical to those set forth in Test Run 1, Part B herein. The tin electrodeposit on the Hull test panel was of fair brightness over a current density range of about 10–60 a.s.f.

TEST RUN NO. 7

Part A

To 250 ml. of water at room temperature in a reaction vessel was added 30 grams of sodium carbonate and 235 grams of crotonaldehyde (90%) (3.02 mole). 69 grams of o-toluidine (0.64 mole) as precursor for the Schiff base-termination of the ultimate homopolymer of crotonaldehyde was added to the resulting liquid mixture, and the thus-obtained mixture stirred for 36 hours. The molar ratio of the o-toluidine to crotonaldehyde was about 1:5 respectively. A Schiff base-terminated, substantially linear, low homopolymer of crotonaldehyde precipitated from the liquid as a dark brown tar-like semi-solid, which was separated by decanting, washed with water, and dissolved in 1500 ml. of isopropanol.

Part B 2 ml. of this isopropanol solution of Schiff base-terminated homopolymer of crotonaldehyde was added to a stannus fluoborate-containing acid tin electroplating bath of substantially identical composition as that set forth in Test Run 1, Part B herein. 0.5 ml. of an ethoxylated nonyl phenol surfactant was also added to such tin electroplating bath. Tin plating was carried out in such electroplating bath in a Hull test cell under operating conditions of current amperage, bath temperature and plating time substantially identical to those set forth in Test Run No. 1, Part B herein. The tin electrodeposit on the Hull test panel exhibited good brightness over a current density range of about 10–40 a.s.f.

TEST RUN NO. 8

Part A

To 50 ml. of water at room temperature in a reaction vessel were added 33 grams of crotonaldehyde (90%) (0.42 mole), 14 grams of acrolein (0.25 mole), 6 grams of sodium carbonate and 13.8 grams of o-toluidine (0.13 mole), with vigorous agitation of the aqueous liquid during the addition. The o-toluidine was a precursor for the Schiff base-termination of the ultimate crotonaldehyde-acrolein copolymer. The molar ratio of the o-toluidine to total crotonaldehyde plus acrolein was about 1:4 respectively. After 48 hours, a Schiff base-terminated, substantially linear, low copolymer of crotonaldehyde and acrolein, which was a brown, resinous solid, precipitated from the liquid, was separated therefrom by decanting, washed with water, and dissolved in 300 ml. of isopropanol.

Part B 3 ml. of such isopropanol solution of Schiff base-terminated crotonaldehyde-acrolein copolymer was added to a stannous fluoborate-containing acid tin electroplating bath of substantially identical composition as that set forth in Test Run No. 1, Part B herein. 0.5 ml. of an ethoxylated nonyl phenol surfactant was also added to such tin electroplating bath. Tin plating was carried out in a Hull test cell under operating conditions of current amperage, bath temperature and plating time substantially identical to those set forth in Test Run No. 1, Part B herein. The tin electrodeposit on the Hull test panel was of good brightness over a current density range of about 10:60 a.s.f.

TEST RUN NO. 9

3 ml. of the isopropanol solution of Schiff base-terminated, substantially linear, low homopolymer of crotonaldehyde prepared in Test Run No. 5, Part A herein, was added to an aqueous acid sulfate tin electroplating bath of the following composition:

| | |
|---|---|
| Stannous sulfate ........................g./l.. | 30 |
| Sulfuric acid ............................ml./l.. | 100 |
| Formaldehyde aqueous solution (37%) ___ml./l.. | 7 |

The sulfuric acid was of 98% sulfuric acid concentration. 2 ml. of an ethoxylated nonyl phenol surfactant was also added to the acid sulfate tin electroplating bath. Tin plating was carried out in such electroplating bath in a Hull test cell under the following operating conditions: operating current of 1 to 3 amps, room temperature of the bath, plating time of 5 minutes. The tin electrodeposit on the Hull test panel was of fair brightness over a current density range of 10–60 a.s.f.

TEST RUN NO. 10

3 ml. of the isopropanol solution of Schiff base-terminated, substantially linear, low copolymer of crotonaldehyde and acrolein prepared in Test Run No. 8, Part B herein was added to an aqueous acid sulfate tin electroplating bath of substantially identical composition as set forth in Test Run No. 9 herein. 2 ml. of an ethoxylated nonyl phenol surfactant was also added to the acid sulfate tin electroplating bath. Tin plating was carried out in such electroplating bath in a Hull test cell under operating conditions of current amperage, bath temperature and plating time substantially identical to those set forth in Test Run No. 9 herein. The tin electrodeposit on the Hull test panel exhibited good brightness over a current density range of about 10–60 a.s.f.

TEST RUN NO. 11

3 ml. of the isopropanol solution of Schiff base-terminated, substantially linear, low homopolymer of crotonaldehyde prepared in Test Run N. 7, Part A herein was added to an aqueous acid sulfate tin electroplating bath of substantially identical composition as set forth in Test Run No. 9 herein. 2 ml. of an ethoxylated nonyl phenol surfactant was also added to the acid sulfate tin electroplating bath. Tin plating was carried out in such electroplating bath in a Hull test cell under operating conditions of current amperage, bath temperature and plating time substantially identical to those set forth in Test Run No. 9 herein. The tin electrodeposit on the Hull test panel was of fair brightness over a current density range of about 10–60 a.s.f.

The following additional tests further illustrate the invention:

An aqueous acid tin electroplating bath was made up having the following composition:

| | |
|---|---|
| Stannous fluoborate ................grams/liter.. | 50 |
| Fluoboric acid ....................grams/liter.. | 100 |
| Formaldehyde ........................cc./liter.. | 10 |

The fluoboric acid of such bath was of 48% fluoboric acid concentration. The formaldehyde of such bath was an aqueous solution of 37% formaldehyde concentration.

A Schiff base-terminated, substantially linear, soluble, low molecular weight homopolymer of crotonaldehyde of this invention and wherein the precursor for the Schiff base-termination of the homopolymer was o-toluidine, in solution in 8 ml. of isopropanol, was added to the stannous fluoborate-containing aqueous acid tin electroplating bath of the composition disclosed immediately supra, and tin electroplating was conducted in such bath in a Hull test cell. The plating bath also contained ethoxylated nonyl phenol as the non-ionic surface active agent. The conditions for the tin plating were: operating current of 1 and 3 amps; room temperature of the bath; time of plating of 5 minutes. A bright smooth tin electrodeposit was obtained on the Hull test panel over the current density range of about 10–60 a.s.f.

The addition of an isopropanol solution of crotonaldehyde per se and o-toluidine to a separate stannous fluoborate-containing aqueous acid tin electroplating bath of composition very similar to that of the stannous fluoborate-containing bath last disclosed herein, but which did not have any polymeric crotonaldehyde added thereto, resulted in a non-bright tin electrodeposit on the test panel under the same conditions of tin plating in the Hull cell as utilized in the test plating described immediately supra.

The addition of a reaction product of acetaldehyde and o-toluidine in 8 ml. of isopropanol to a separate stannous fluoborate-containing aqueous acid tin electroplating bath of the composition last disclosed herein and which also contained ethoxylated nonyl phenol as surfactant but which did not have any polymeric crotonaldehyde added thereto, yielded an unsatisfactory, streaked bright tin deposit on the Hull test panel under the same plating conditions in the Hull test cell as employed in the two plating tests set forth immediately supra. The tin deposit was unsatisfactory due to the streaking in the deposit. The plating bath also contained objectionable and deleterious precipitates due to the acetaldehyde-o-toluidine reaction product.

In additional tests carried out in a Hull test cell and with a stannous fluoborate-containing acid tin electroplating bath of composition very similar to that of the bath last disclosed herein, addition to the bath of an isopropanol solution of a Schiff base-terminated copolymer of crotonaldehyde and methacrolein copolymerized in a mole ratio of 4:1 respectively resulted in a tin electrodeposit of good brightness on the Hull test panel; addition to a separate quantity of the electroplating bath in a Hull cell of an isopropanol solution of a Schiff base-terminated copolymer of crotonaldehyde and acrylamide copolymerized in a mole ratio of 1:4 respectively resulted in a tin electrodeposit on the Hull test panel of fair brightness. All of the copolymers were Schiff base-terminated utilizing o-toluidine and, in addition were substantially linear, low copolymers.

The bright tin electrodepositing of the present invention has utility for preparation of electrical contacts, electronic components, hardware and jewelry. The deposits are ductile and can be soldered.

What is claimed is:

1. An aqueous acid bright tin electrodepositing bath comprising tin ions, free acid selected from the group consisting of sulfuric, fluoboric and aromatic sulfonic acids, a non-ionic surface active agent and as a brightening agent a Schiff base-terminated, substantially linear, soluble polymeric crotonaldehyde having a molecular weight in the range of about 300–900, the polymeric crotonaldehyde having been prepared by a polymerization process wherein the mole ratio of a primary amine precursor of the Schiff base terminal group to $\alpha$-, $\beta$-ethylenically unsaturated aldehyde polymerizable reactant provided in the polymerization reaction mixture is in the molar ratio range of from about 1:2.5 to about 1:7.5 respectively, said non-ionic surface active agent and said polymeric crotonaldehyde each being present in a minor amount sufficient to yield a bright tin electrodeposit.

2. The bath of claim 1 wherein the Schiff base terminal group of the polymer has the formula

—CH=NR wherein R is the remainder of the residue of a primary amine.

3. The bath of claim 2 wherein R is an aryl radical.

4. The bath of claim 1 wherein the Schiff base terminal group is of the formula

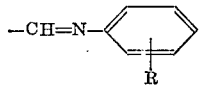

wherein R is —CH$_3$ or —H.

5. The bath of claim 2 wherein the free acid is fluoboric acid and the tin ions are supplied to the bath by stannous fluoborate.

6. The bath of claim 5 wherein the polymeric crotonaldehyde is a homopolymer of crotonaldehyde.

7. The bath of claim 5 wherein the polymeric crotonaldehyde is a copolymer of crotonaldehyde and a compound selected from the group consisting of acrolein, methacrolein, formaldehyde, acrylamide and vinyl acetate.

8. The bath of claim 7 wherein the copolymerizable compound is acrolein.

9. The bath of claim 7 wherein the copolymerizable compound is methacrolein.

10. The bath of claim 7 wherein the copolymerizable compound is formaldehyde.

11. The bath of claim 7 wherein the copolymerizable compound is acrylamide.

12. The bath of claim 7 wherein the copolymerizable compound is vinyl acetate.

13. The bath of claim 1 further characterized by the polymerization process comprising effecting the polymerizing of the crotonaldehyde in the presence of the primary amine in an aqueous alkaline liquid medium.

14. The bath of claim 13 wherein the aqueous alkaline medium is a dilute aqueous solution of a weak base.

15. The bath of claim 14 wherein the weak base is an alkali metal carbonate.

16. The bath of claim 15 wherein the alkali metal carbonate is sodium carbonate.

17. The bath of claim 15 wherein the alkali metal carbonate is potassium carbonate.

18. A method for the electrodeposition of bright tin which comprises passing an electrical current from an anode through an aqueous acid tin electrodepositing bath to a cathode on which the tin is electrodeposited, the bath comprising tin ions, free acid selected from the group consisting of sulfuric, fluoboric and aromatic sulfonic acids, a non-ionic surface active agent, and as a brightening agent a Schiff base-terminated, substantially linear, soluble polymeric crotonaldehyde having a molecular weight in the range of about 300–900, the polymeric crotonaldehyde having been prepared by a polymerization process wherein the mole ratio of the primary amine precursor of the Schiff base terminal group to α-, β-ethylenically unsaturated aldehyde polymerizable reactant provided in the polymerization reaction mixture is in the molar ratio range of from about 1:2.5 to about 1:7.5 respectively, said non-ionic surface active agent and said polymeric crotonaldehyde each being present in a minor amount sufficient to yield a bright tin electrodeposit.

19. The method of claim 18 wherein the Schiff base terminal group of the polymer has the formula

—CH=NR wherein R is the remainder of the residue of a primary amine.

20. The method of claim 19 wherein R is an aryl radical.

21. The method of claim 18 wherein the Schiff base terminal group is of the formula

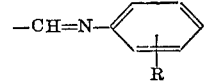

wherein R is —CH$_3$ or —H.

22. The method of claim 18 further characterized by the polymerization process comprising effecting the polymerizing of the crotonaldehyde in the presence of the primary amine in an aqueous alkaline liquid medium.

23. The method of claim 22 wherein the aqueous alkaline medium is a dilute aqueous solution of a weak base.

24. The method of claim 23 wherein the weak base is an alkali metal carbonate.

References Cited

UNITED STATES PATENTS

| 3,361,652 | 1/1968 | Korpuin et al. | 204—54 R |
| 3,471,379 | 10/1969 | School et al. | 204—54 R |
| 2,552,920 | 5/1951 | Allen | 204—54 R |
| 2,734,025 | 2/1956 | Roehl | 204—43 |

FOREIGN PATENTS

| 652,405 | 12/1964 | Belgium | 204—54 R |
| 1,392,257 | 2/1965 | France | 204—54 R |

FREDERICK C. EDMUNDSON, Primary Examiner

U.S. Cl. X.R.

204—DIG 2